(No Model.) 3 Sheets—Sheet 1.
W. H. HONISS & W. A. LORENZ.
MECHANICAL MOTION.
No. 380,392. Patented Apr. 3, 1888.
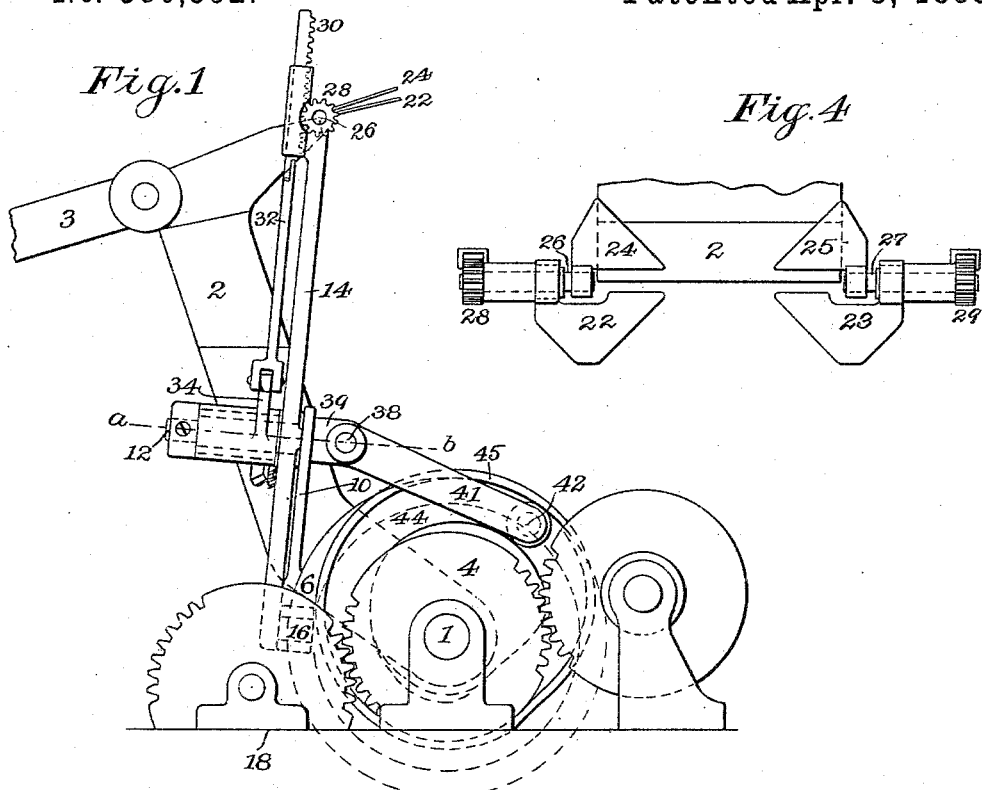
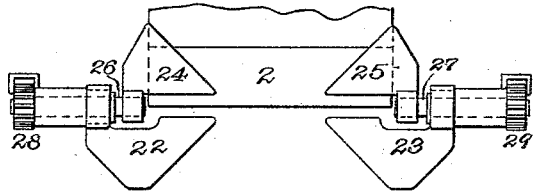
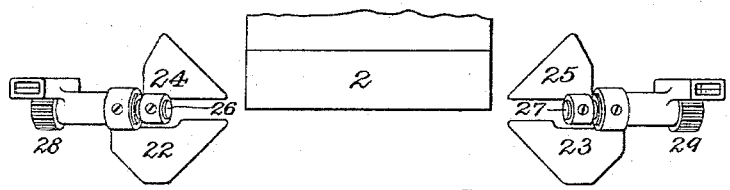
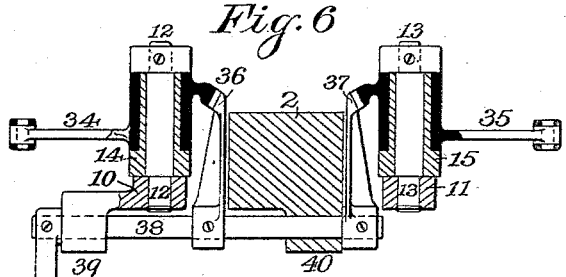
Witnesses.
Frank H. Pierpont
C. E. Buckland
Inventors.
William H. Honiss
William A. Lorenz
By their Attorney Albert H. Walker (No Model.) 3 Sheets—Sheet 2.

W. H. HONISS & W. A. LORENZ.
MECHANICAL MOTION.

No. 380,392. Patented Apr. 3, 1888.

Witnesses:
Frank H. Pierpont
C. E. Buckland

Inventors.
William H. Honiss
William A. Lorenz
By their Attorney
Albert H. Walker (No Model.) 3 Sheets—Sheet 3.
W. H. HONISS & W. A. LORENZ.
MECHANICAL MOTION.
No. 380,392. Patented Apr. 3, 1888.
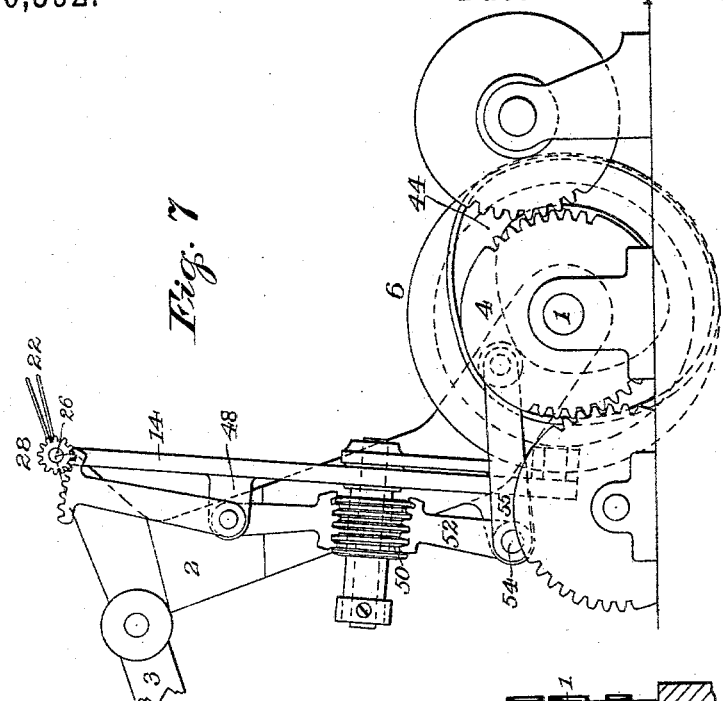
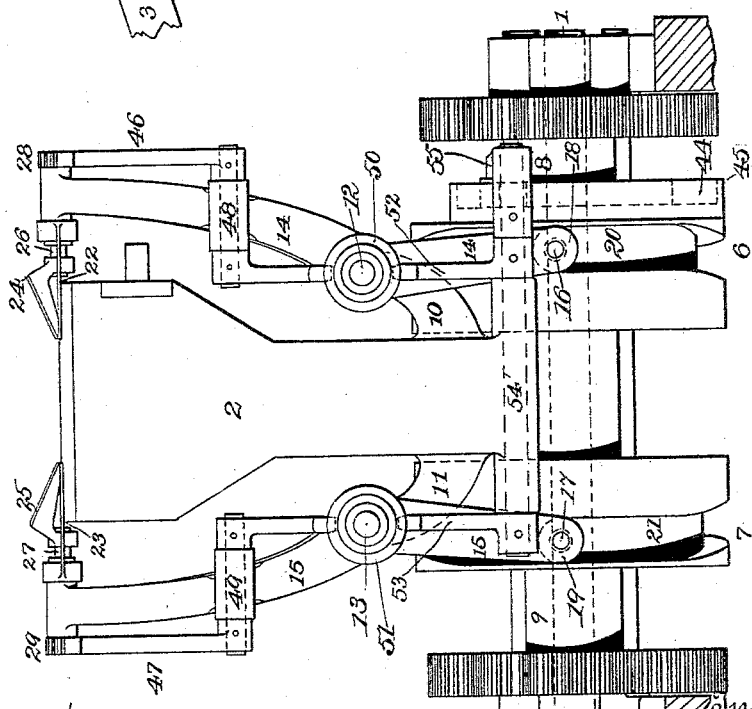

UNITED STATES PATENT OFFICE.

WILLIAM H. HONISS AND WILLIAM A. LORENZ, OF HARTFORD, CONNECTICUT.

MECHANICAL MOTION.

SPECIFICATION forming part of Letters Patent No. 380,392, dated April 3, 1888.

Application filed March 7, 1887. Serial No. 229,893. (No model.)

*To all whom it may concern:*

Be it known that we, WILLIAM H. HONISS and WILLIAM A. LORENZ, of Hartford, Connecticut, have invented a new and useful Mechanical Motion, of which the following description and claims constitute the specification, and which is illustrated by the accompanying three sheets of drawings.

This invention is a mechanical motion, which consists in means for rocking a carriage upon a shaft and oscillating a lever by a cam surrounding that shaft, so that the working end of the lever rocks with the carriage and also oscillates at an angle to the direction of that rocking; and it consists, further, in means for rocking another shaft upon the working end of that lever by another cam surrounding the first-mentioned shaft.

Figure 2:
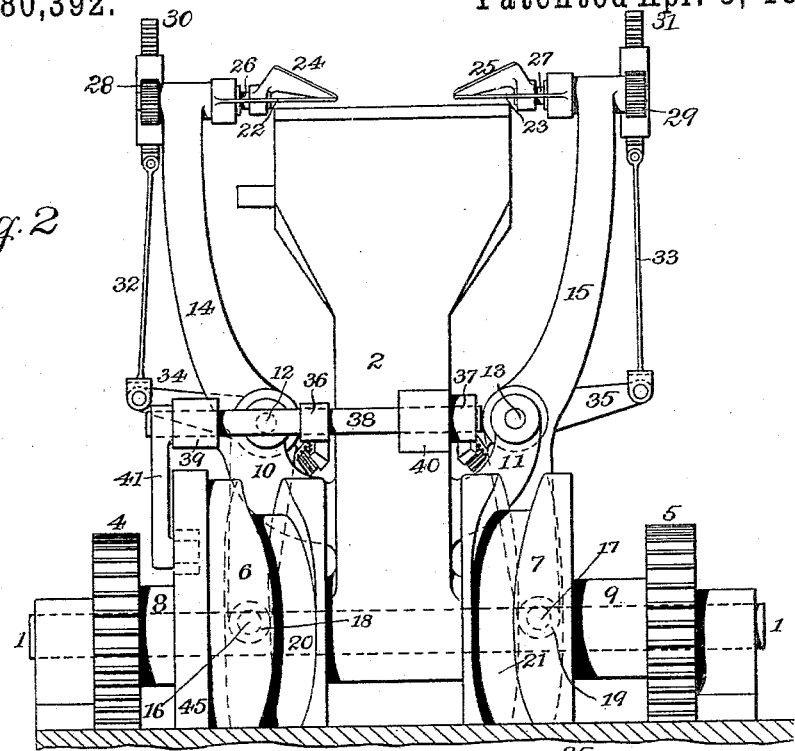
Figure 3:
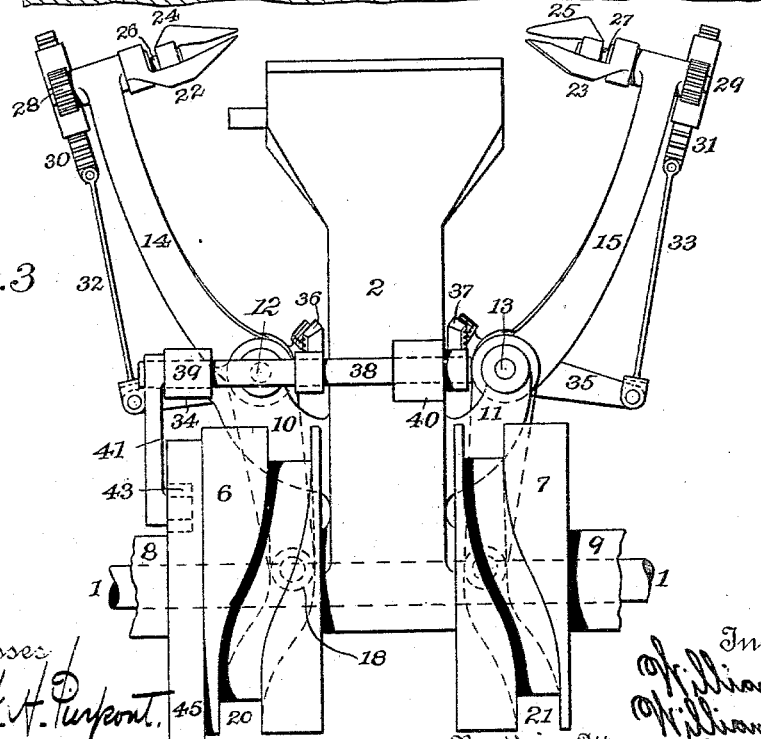

Figure 1 is a side view of our new mechanical motion with some proper environment. Fig. 2 is an elevation of the right-hand end of most parts of what is shown in Fig. 1. Fig. 3 shows a portion of Fig. 2, but in another position. Fig. 4 is a plan view of the topmost part of what is shown in the preceding figures; and Fig. 5 is identical with Fig. 4, except that the parts are in a different position. Fig. 6 is a horizontal section on the line *a b* of Fig. 1. Fig. 7 is a side view of a modified form of what is shown in Fig. 1, while Fig. 8 is an elevation of the left-hand end of what is shown in Fig. 7.

The numeral 1 indicates a shaft, upon which the arm 2 is caused to rock by the connecting-rod 3, which connecting-rod gets its motion from a crank. (Not shown in the drawings.) The gears 4 and 5 are caused, in any proper manner, to turn loosely upon the shaft 1 in the same direction and at the same speed, and they respectively carry the cam-disks 6 and 7 along with them by means of the intervening sleeves 8 and 9, respectively. The arm 2 has the ears 10 and 11, carrying the fixed studs 12 and 13, and the levers 14 and 15 turn upon those studs, respectively. These levers are provided with the studs 16 and 17, carrying cam-rolls 18 and 19, which run in the cam-grooves 20 and 21 of the cam-disks 6 and 7, respectively. The blades 22 and 23 are fixed to the upper ends of the levers 14 and 15, respectively, and the folding blades 24 and 25 turn with the shafts 26 and 27 in proper bearings in the same ends of those respective levers. Those shafts are made to rock by the pinions 28 and 29 and the racks 30 and 31, respectively, and those racks are worked by the connecting-rods 32 and 33 and the levers 34 and 35, respectively. Those levers turn upon the respective hubs of the levers 14 and 15, which latter turn upon the studs 12 and 13, respectively. The inner ends of the levers 34 and 35 are bevel-sectors, which mesh with the bevel sector arms 36 and 37, respectively, and those arms are worked by the shaft 38, which turns in bearings in the brackets 39 and 40, and which brackets are appurtenant to the ear 10 and the arm 2, respectively. The arm 41 is fixed to the outer end of the shaft 38, and its outer end is provided with the pin 42, carrying the cam-roll 43, and that cam-roll runs in the cam-groove 44 in the cam-disk 45, while that disk is fixed to the cam-disk 6, so as to revolve on the same axis with it.

The modified form of this invention which is shown in Figs. 7 and 8 is the same as that hereinbefore described down as far as the pinions 28 and 29; but in that modified form those pinions are worked by the levers 46 and 47, respectively. Those levers turn in bearings in the brackets 48 and 49, which project respectively from the levers 14 and 15. The upper ends of the levers 46 and 47 are sectors working the pinions 28 and 29, while the lower ends are sectors worked by the toothed sliding sleeves 50 and 51, respectively. Those sleeves slide upon the hubs of the levers 14 and 15, and are worked by the arms 52 and 53, respectively. Those arms are fixed to the shaft 54, and that shaft is rocked by the arm 55. That arm is provided with a pin and cam-roll which runs in the cam-groove 44.

The mode of operation is as follows: The arm 2 is rocked by the connecting-rod 3 on the shaft 1 at such a speed as may be desired, and the cam-disks 6, 7, and 45 are revolved by any proper means once for each backward and forward motion of the arm 2. That revolution causes the cams 6 and 7 to force the levers 14 and 15 toward each other to the position in Fig. 2, and then away from each other to the position shown in Fig. 3, and that revolution also causes the cam 45 to rock the shafts 28 and 29 so as to carry the blades 24 and 25 from the positions directly over the blades 22 and 23, respectively, through about half of a revolution, to the position shown in Fig. 4, and afterward to return the blades to the positions first mentioned. The cams 6, 7, and 45 may be adjusted to any desired positions relatively to each other or relatively to the other parts of the apparatus, and thus the levers 14 and 15 may have their lateral vibrations timed as desired relatively to the longitudinal rocking in which they participate with the arm 2, and the shafts 26 and 27 may have their rocking timed as desired relatively to those vibrations and also relatively to that rocking of the levers 14 and 15. This special use of a pair of our mechanical motions in working the two pairs of blades shown in the drawings is also shown in our application, No. 216,504, of October 18, 1886, for Letters Patent on a paper-bag machine; but either member of the described two-sided apparatus may be used for a variety of purposes in a variety of machines, and therefore we now claim the mechanical motion itself, as follows:

1. The combination of the shaft 1, the arm 2, rocking on that shaft, the cam 6, provided with the endless cam-groove 20, and the lever 14, worked by that cam, all constructed and arranged so that the lever 14 rocks with the arm 2 and also vibrates at an angle to the direction of that rocking, all substantially as described.

2. The combination of the cam 6, the lever 14, the cam 45, the shaft 26, and arms and rock-shafts intermediate the cam 45 and the shaft 26, all so constructed and arranged that the shaft 26 rocks on the lever 14 while that lever vibrates on its fulcrum, all substantially as described.

Dated March 4, 1887.

WILLIAM H. HONISS.
WILLIAM A. LORENZ.

Witnesses:
ALBERT H. WALKER,
HENRY L. RECKARD.